Nov. 10, 1942.                 C. I. MacNEIL                  2,301,428
                            FLUID FLOW CONTROL
                       Original Filed Sept. 20, 1940
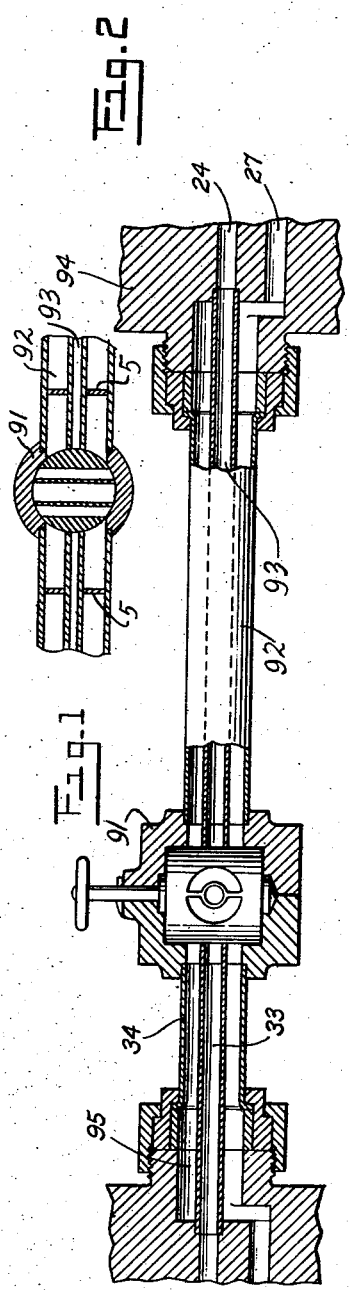
INVENTOR.
Charles I. Mac Neil
BY
Martin J. Finnegan
ATTORNEY.

Patented Nov. 10, 1942

2,301,428

UNITED STATES PATENT OFFICE 2,301,428

FLUID FLOW CONTROL

Charles I. MacNeil, Glen Ridge, N. J., assignor to Bendix Aviation Corporation, South Bend, Ind., a corporation of Delaware Original application September 20, 1940, Serial No. 357,642, now Patent No. 2,254,970, dated September 2, 1941. Divided and this application February 7, 1941, Serial No. 377,930

1 Claim. (Cl. 137—69)

This invention relates to the control of the flow of fluid in fluid-confining channels, such as pipes, tubing, hose, oil lines, or other conduits.

An object of the invention is to provide novel means for controlling fluid flow in instances where the flow occurs through coaxial conduits.

A further object is to provide a novel valve construction for the simultaneous control of flow of fluid in more than a single conduit.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claim for this purpose.

In the drawing:

Fig. 1 is a transverse sectional view of the rotor of a valve embodying the invention; and Fig. 2 is a view of the complete valve and the conduits leading thereto.

The invention is shown embodied in a valve 91 interposed in a pair of coaxially disposed conduits 92 and 93 to provide a unitary control of flow therethrough. These coaxially disposed pipes 92 and 93 may be inserted in the system in such manner as to be supplied by parallel passages 27 and 24, respectively, formed in a supporting housing 94; the connection therebetween being effected by forming a fluid chamber in the housing 94, into which the conduit 93 passes, to register with passage 24, while conduit 92 registers with said fluid chamber, as does also passage 27. It will be understood that pipe 93 is supported along its length by suitable means 5, as shown, extending transversely into contact with outer pipe 92, but without blocking flow through the latter. Such supporting means for pipe 93 may be of any type conventionally used for supporting inner coaxial pipes, and is not claimed as any part of this invention. As for outer pipe 92, this, of course, is supported at one end by housing 94, and by the housing of valve 91 at the other end. With the arrangement as shown it will be seen that a ninety-degree rotation of the rotor of valve 91 may operate to establish or disestablish communication between the right and left hand sections of the coaxial pipes 92 and 93; and by providing at the opposite end a chamber 95 similar to the chamber 94, the said coaxial pipes will, of course, operate to feed fluid from housing 94 to housing 95, whenever valve 91 is in the open position. It will further be understood that such coaxial pipes may be used at any other point in this or other systems where parallel pipes are employed; and in every such installation they will have the advantage of reducing the total space occupied by the pipes, as well as affording additional protection against any injury to the pipes—whether from ordinary causes or from extraordinary causes, such as contact with a bullet or projectile fragment aimed at an aircraft on which the system may be installed. It will be observed that the rotor of valve 91 includes a central chamber adapted to register with the inner coaxial conduit 93 in one position thereof, a pair of arcuate ports alignable with sections of the outer coaxial conduit 92 in said one position of the rotor—the material between adjacent ends of said arcuate ports constituting the supporting means for said central chamber—and a projecting stem on said rotor, said stem having a handle for rotating the rotor to the "off" position shown in the drawing, in which "off" position no flow can occur.

This application is a division of my application No. 357,642, filed September 20, 1940, now Patent No. 2,254,970, granted September 2, 1941.

What is claimed is:

A valve body having diametrically opposed circular openings, means coacting with the walls of said openings to form a pair of coaxial passages at each end of the valve body, means for controlling fluid flow in said passages, said means comprising a valve rotor having a central chamber therethrough which is in registry with the inner coaxial passage in one position of the valve, a pair of arcuate ports alignable with sections of the outer coaxial passage in said one position of the valve, the material between adjacent ends of said arcuate ports constituting the supporting means for said central chamber, and means for rotating said valve rotor from said one position to a different position in which no flow through either passage can occur.

CHARLES I. MacNEIL.